United States Patent [19]

Eichmuller et al.

[11] 4,328,637

[45] May 11, 1982

[54] SNAIL TRAP

[75] Inventors: Karl Eichmuller, Oberriet; Werner Dubach, Wallisellen, both of Switzerland

[73] Assignee: Createchnic Patent AG, Dietlikon, Switzerland

[21] Appl. No.: 156,322

[22] Filed: Jun. 4, 1980

[51] Int. Cl.³ .............................................. A01M 1/10
[52] U.S. Cl. ........................................ 43/121; 43/131
[58] Field of Search ................. 43/121, 131; 209/682, 209/614; 210/238, 470, 482

[56] References Cited

U.S. PATENT DOCUMENTS

| | | | |
|---|---|---|---|
| 644,262 | 2/1900 | Stair | 210/238 |
| 3,380,592 | 4/1968 | Arnold | 210/470 |
| 3,392,845 | 7/1968 | Shapiro et al. | 210/470 |
| 3,550,308 | 12/1970 | Ibach | 43/121 |

*Primary Examiner*—James L. Jones, Jr.
*Attorney, Agent, or Firm*—Darbo & Vandenburgh

[57] ABSTRACT

A pan having a perforated bottom is within and rests on the bottom of the snail trap container which is inserted into the ground. An upwardly extending handle of the pan carries a cover and supports it above the open top of the container to serve as a rain shield. The handle is hollow and receives a float. A liquid level gauge in the form of a rod is affixed to the float and projects upwardly through the top of the handle.

4 Claims, 2 Drawing Figures

SNAIL TRAP

FIELD OF THE INVENTION

The invention relates to snail traps of the type comprising a container which can be fitted into the ground and which is filled with a liquid which entices snails.

BACKGROUND OF THE INVENTION

Snail traps of this general type are known. A bowl of plastic material is generally used and is inserted into the ground up to its rim and then filled with beer. Other liquids, such as fermented apple juice, can be used instead of beer.

Snails are night creatures. They are enticed in the darkness by the liquid used as bait and drink it. The alcohol apparently causes loss of sense of balance and the snails drown in the liquid. They shrink in volume when they die, so that a bowl can hold a large number of snail carcasses. The bowl should be sufficiently deep to ensure that the snails actually drown since they might be able to crawl out of a shallow container.

The chief disadvantage of these known snail traps is that the removal of the snail carcasses is an unpleasant and offensive task. One can, of course, empty the container as a whole together with the liquid, even though the latter would still be usable. If the snail carcasses are left for too long a period of time in the liquid, the liquid loses its efficacy as bait. Snails appear particularly during wet weather and rain, and the latter in turn dilutes the liquid bait, thus reducing it efficacy.

It is therefore an object of the present invention to facilitate the removal of snail carcasses from a snail trap of the type containing a liquid bait.

It is another object of the invention to provide an improved trap design such that rain cannot enter the bait liquid.

SUMMARY OF THE INVENTION

According to the present invention there is provided a snail trap comprising a container which can be fitted into the ground and which is filled with a liquid which entices snails characterized in that a sleeve-like collecting device is disposed in the container to rest on the bottom thereof and is provided with means projecting upwardly beyond the rim of the container for the purpose of lifting the collecting device out of the container.

It is advantageous if the means for lifting out the collecting device includes at least one upright which carries a cover extending beyond the rim of the container, so that rain cannot enter the container.

DETAILED DESCRIPTION

Figure 1:
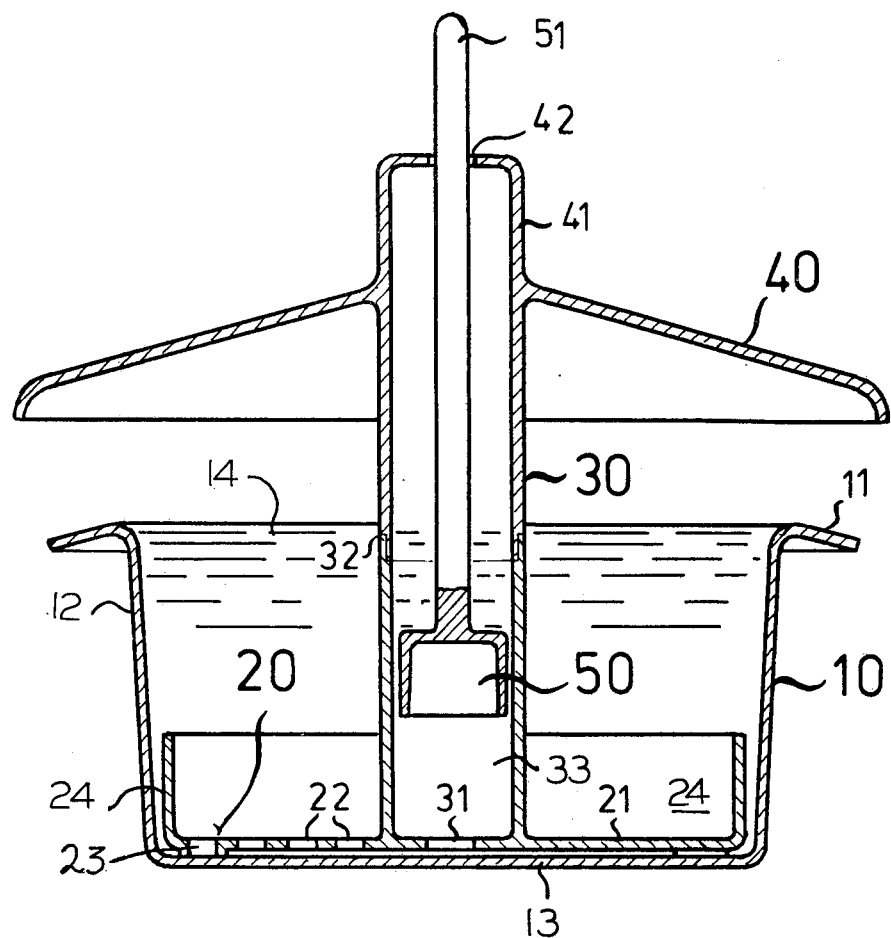
FIG. 1 is an elevational cross-section of a snail trap embodying the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disquise it by variations in form or additions or further improvements.

The main components of the snail trap are a container 10 which can be inserted into the ground, and a sieve-like collecting device 20 which rests on the interior bottom of the container. The container has a rim 11 which projects outwardly from the top of the side walls 12, and a bottom 13. The walls and bottom define a space for receiving the liquid 14 for attracting snails, as previously described. The collecting device has a hollow upright 30 extending from the center thereof. This upright supports a cover 40. The upright 30 projects upwardly beyond the cover 40 and forms a handle 41. The upright has a hollow interior 33 within which is a float 50 having a stem 51. The stem projects outwardly through an opening 42 in the top of the upright. The float and stem indicate the level of the liquid in the container 10.

The bottom of the upright 30 has an opening 31 to provide communication between the hollow interior and the liquid in the container. To facilitate molding (e.g., from plastic) of the construction of the collecting device and upright, the hollow upright is of split construction as seen at 32. This also permits the float 50 and its stem to be inserted into the hollow interior of the upright. After the two components of the upright are molded, and the float and stem inserted therein, they are suitably affixed to each other at the joint 32 therebetween.

The sieve-like collecting device 20 is in the form of an open-top pan or container. The periphery of the pan, defined by side walls 24, at its top is sufficiently close (as is illustrated) to the container walls 12 that snail carcasses will not fall therebetween but will descend to the bottom 21 of the pan. The bottom 21 of the pan has a large number of perforations or openings 22. These openings are sufficiently small to prevent a snail carcass from passing therethrough. Support feet 23 project down from the underside of the bottom 21 of the collecting device in order to prevent the opening 31 from being closed when the collecting device is placed on the bottom of the container 10.

Figure 2:
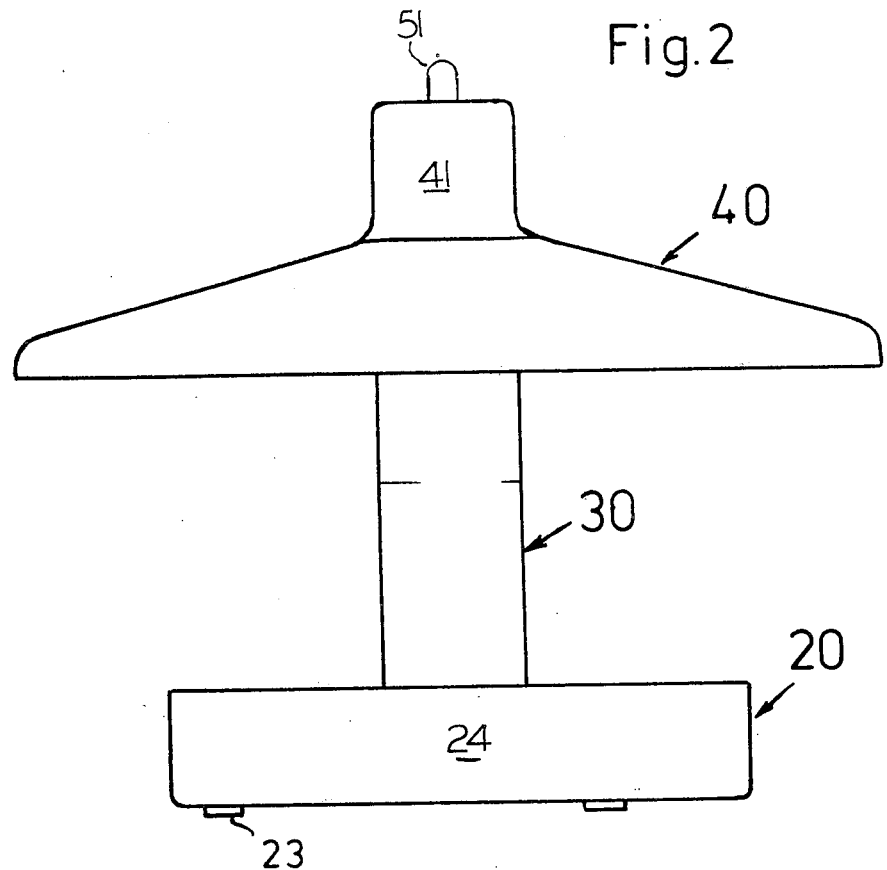
FIG. 2 shows the same trap fitted in the ground with the collecting container having been lifted out.
Figure 2:
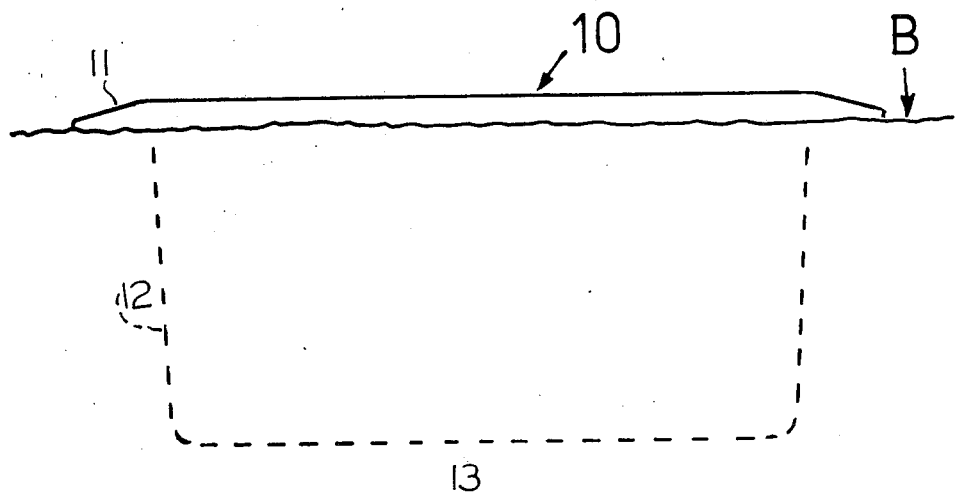

The outwardly extending rim 11 about the container serves to reinforce the container and at the same time ensures that the container is not inserted too deeply into the ground. FIG. 2 shows the depth to which the container should be inserted into the ground, i.e., with its rim 11 about level with the surface B of the ground. FIG. 2 also shows the collecting device 20 with the cover 40 displaced out of the container. Of course, this would be done by grasping the handle portion 41 of the upright and lifting it vertically away from the container.

Advantageously, all the parts of the trap are made from plastic material, as by molding.

We claim:

1. In a snail trap comprising an open-top container having side walls and a bottom defining a space for receiving a liquid, said container being adapted to be inserted into the ground and to receive in said space a liquid which attracts snails, the improvement comprising:
   a sieve-like, snail collecting device within said container and resting on the bottom thereof, said device having
      a periphery in juxtaposition to said walls,
      handle means comprising an upright extending vertically from the center of the device to a level above the top of the container for use in lifting the device out of the container, and includes a cover which projects outwardly beyond said walls and is at an elevation above the top of the container, wherein said upright projects above said cover, and wherein said upright has a hollow interior and a top, means providing fluid communication between the hollow interior and the space within the container, and including a float in said interior and having a stem projecting upwardly beyond the top of the upright to serve as a gauge to indicate the level of the liquid in the container.

2. In a snail trap comprising an open-top container having side walls and a bottom defining a space for receiving a liquid, said container being adapted to be inserted into the ground and to receive in said space a liquid which attracts snails, the improvement comprising:

a sieve-like, snail collecting device within said container and resting on the bottom thereof, said device having
a periphery in juxtaposition to said walls,
handle means comprising an upright extending vertically from the center of the device to a level above the top of the container for use in lifting the device out of the container, and includes a cover which projects outwardly beyond said walls and is at an elevation above the top of the container, wherein said upright has a hollow interior and a top, means providing fluid communication between the hollow interior and the space within the container, and including a float in said interior and having a stem projecting upwardly beyond the top of the upright to serve as a gauge to indicate the level of the liquid in the container.

3. In a device as set forth in claim 2, wherein said device has a bottom with a central opening therethrough and providing said fluid communication means and feet projecting downwardly from the bottom of the device to support it above the container bottom.

4. In a snail trap comprising an open-top container having side walls and a bottom defining a space for receiving a liquid, said container being adapted to be inserted into the ground and to receive in said space a liquid which attracts snails, the improvement comprising:

a sieve-like, snail collecting device within said container and resting on the bottom thereof, said device having a periphery in juxtaposition to said walls;
a cover positioned above said container and projecting outwardly beyond said walls;
means connecting the cover and the device and so positioning the cover from the device; and
gauge means mounted from said device for indicating the liquid level in said space and including a vertically movable float in said space and within the periphery of the device.

* * * * *